C. HENSOLDT.
EXTENSIBLE POCKET MICROSCOPE WITH VARIABLE ENLARGEMENT AND WITH FINE ADJUSTMENT.
APPLICATION FILED JAN. 10, 1922.
1,418,645.
Patented June 6, 1922.
3 SHEETS—SHEET 1.
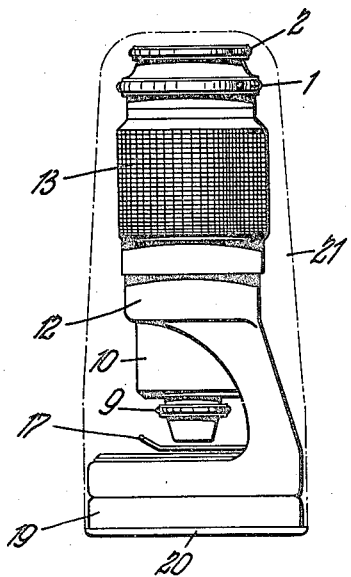
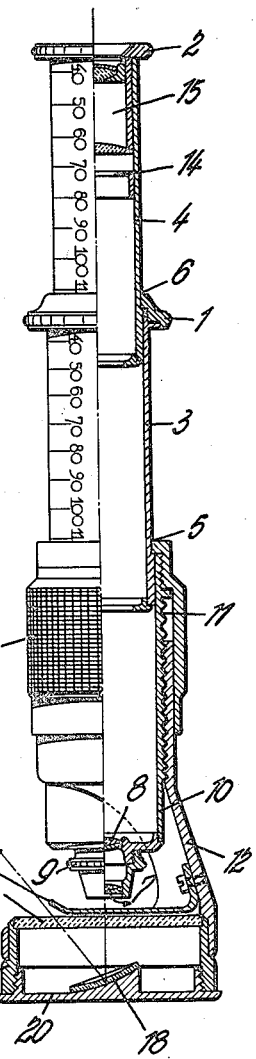
Inventor
Carl Hensoldt
By Edward C. Jarnett,
Attorney.

C. HENSOLDT.
EXTENSIBLE POCKET MICROSCOPE WITH VARIABLE ENLARGEMENT AND WITH FINE ADJUSTMENT.
APPLICATION FILED JAN. 10, 1922.
1,418,645.
Patented June 6, 1922.
3 SHEETS—SHEET 2.
FIG. 3.
FIG. 4.
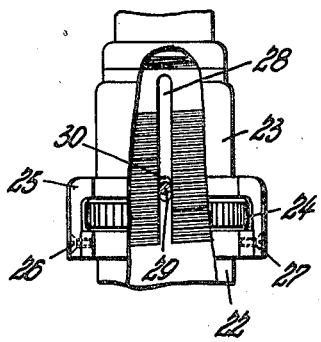
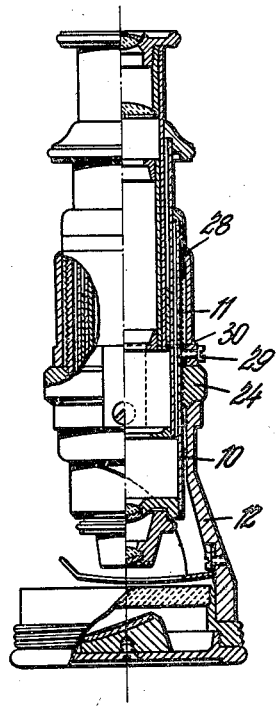

C. HENSOLDT.
EXTENSIBLE POCKET MICROSCOPE WITH VARIABLE ENLARGEMENT AND WITH FINE ADJUSTMENT.
APPLICATION FILED JAN. 10, 1922.

1,418,645.

Patented June 6, 1922.

UNITED STATES PATENT OFFICE.

CARL HENSOLDT, OF WETZLAR, GERMANY.

EXTENSIBLE POCKET MICROSCOPE WITH VARIABLE ENLARGEMENT AND WITH FINE ADJUSTMENT.

1,418,645.　　　　　Specification of Letters Patent.　　Patented June 6, 1922.

Application filed January 10, 1922. Serial No. 528,168.

*To all whom it may concern:*

Be it known that I, CARL HENSOLDT, a citizen of the German Republic, residing at Wetzlar, Germany, have invented certain new and useful Improvements in Extensible Pocket Microscopes with Variable Enlargements and with Fine Adjustments (for which I have filed application in Germany Jan. 6, 1921; Nov. 10, 1921; Nov. 28, 1921), of which the following is a specification.

In the construction of microscopes the principal object in view has been hitherto to obtain a maximum optical effect, less attention having been paid to the construction of the microscope as a pocket instrument. There have become known already pocket-lenses with variable enlargement which have been sometimes called unjustly "pocket microscopes" as they do not possess the properties of a microscope.

This invention has for its object to construct a microscope which can be easily carried in the pocket and which possesses nevertheless all the properties of a good microscope. In order to reduce as much as possible the size of the microscope when not in use the object-tube comprises two telescoping tubes, the mechanism for the fine adjustment being axially arranged and the lighting device arranged at the lowest point.

Scales with similar divisions are marked upon the two parts of the object-tube by means of which the desired enlargement can be determined. A sleeve is provided for the fine-adjustment which serves at the same time for protecting the fine-adjusting thread arranged under the same. The lighting device is mounted upon the base plate of a sleeve and it is well protected against dirt by the stage for examining objects.

In order that the invention may be clearly understood, I shall proceed to describe the same with reference to the form of construction shown by way of example on the accompanying drawings, wherein:—

Fig. 1 shows the pocket microscope pushed together.

Fig. 2 shows the same pulled out.

Fig. 3 represents the special device for the fine adjustment.

Fig. 4 is a fragmentary elevation with parts broken away to show details of the fine adjustment.

Figure 5:
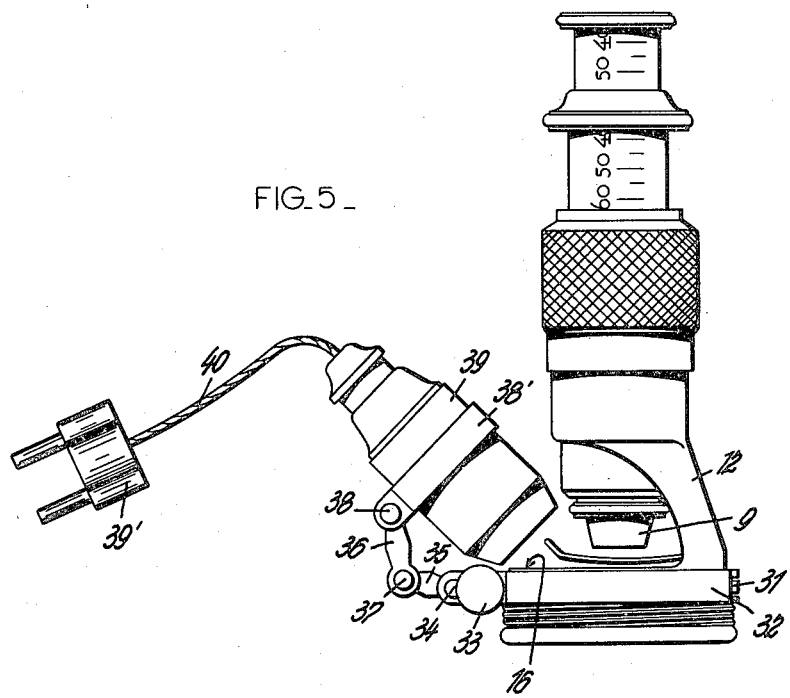
Figs. 5 and 6 show two forms of the device provided with artificial lighting.

The tubes 3 and 4 telescoped in the object-tube 10 can be pulled out at 5 with the aid of the externally milled rings 1 and 2. Both tubes, as clearly shown in Fig. 2, are provided with a longitudinal scale. The scale on the upper tube should be read with reference to the upper edge 6 of ring 1 on tube 3, and the scale on the lower tube should be read with reference to the upper edge 5 of a sleeve on the object tube 10. The sum of the scale readings for any particular adjustment of the tubes represents the power or enlargement of the microscope for that particular adjustment. For example, with the tubes completely extended, as shown by Fig. 2, both scales read 111, and therefore the microscope is adjusted for an enlargement of 222, the sum of the two scale readings.

The object glass consists of a double lens 7 and 8. With the aid of the milled ring 9 the lens 7 can be removed and the microscope can be used only with the lens 8. The enlargement can be read also in this case upon the scales but the scale value must be divided by two.

The fine-adjustment of the microscope as shown on Figs. 1 and 2 is effected by the simplest means. The object-tube 10 has an external thread 11 which is screwed into a corresponding female thread of the foot 12 of the microscope. A milled sleeve 13 serves to facilitate the rotation of the tube 10. The sleeve 13 projects over the foot of the microscope so far that the thread 11 never becomes visible and is thus well protected against damage. The instrument is inserted for transport in a cylindrical or conical protecting envelope 21.

The mechanism for the fine-adjustment can further comprise a positive guiding whereby the axial displacement without simultaneous rotation of the object-tube is rendered possible. With this object in view this upper cylindrical part of the foot 12 of the microscope is cut away transversely to the axis (Figs. 3 and 4). Between the parts 22 and 23 which are thus formed a milled threaded ring 24 is inserted, which is secured in its position by the bridge 25 which connects the upper part 23 with the lower part 22 by the screws 26 and 29. The object-tube 10 has an external fine thread 11 for the fine adjustment, and a groove 28 is cut into the threaded part parallel to the optical axis. A nose 30 held by a screw 29 engages with this groove 28. If the milled ring 24 is being turned the object tube is positively moved only in the direction of the optical axis without participating in the rotation.

In order to make the instrument adapted to be used also under unfavorable conditions of light a device for artificial lighting is provided which can be easily connected with the otherwise unaltered foot of the microscope.

The lighting device is fixed, according to the forms of construction shown on Fig. 5 upon the foot 12 of the microscope under the object-glass 9 by means of a clamping ring 32 with articulated arm 31 and with the aid of a stud screw 33.

The diameter of the clamping ring corresponds with the cross section of the part of the microscope upon which said ring is fixed. Any convenient clamping device can obviously be substituted for ring 32. An articulation is connected with said ring by means of a bolt 34, the arms 35 and 36 of said articulation being pivotable around a stud 37. The free end of the arm 36 is pivotably fixed to a ring 38' by a stud 38, said ring being fixed upon the casing 39 of the incandescent lamp. In the casing 39 a convenient source of electric light is arranged which can be supplied with current from any electric installation by means of a cable 40 with a two-pin plug 39'.

Figure 6:
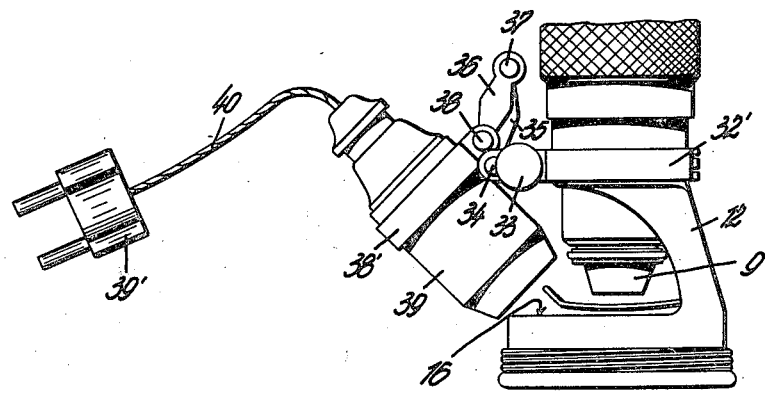

The form of construction of the lighting device shown on Fig. 6 is similar to that shown on Fig. 5. The clamping ring 32' corresponds in diameter with the cross section of foot 12 of the microscope but is mounted above the object-glass 9. This form of construction facilitates the putting of the object to be examined upon the stage 16 as the lower part of the foot of the microscope is absolutely free.

The microscope is used in the following manner:—

After the tubes 3 and 4 have been adjusted to the desired enlargement with the aid of the scales, the distance between the object-glass and the object to be examined is regulated by rotation of the milled ring 13 or 24 (Figs. 3 and 4) until the image of the object is clearly seen in the image plane of the microscope situated at 14. The entire upper part of the microscope arranged in the foot 12 participates in the fine-adjusting. The eye-lens 15 is mounted in the upper end of the tube 4.

The stage for the object to be examined consists of a glass plate 16 upon which the object to be examined is held by clamping springs 17. The mirror 18 serves for illuminating the object. The mirror and the glass plate are connected the one with the other by the sleeve 19 and by the base plate 20 so that they can be taken together out of the foot of the microscope.

If the illuminating device is removed in this manner from the foot 12 of the microscope, the foot of the microscope can be directly placed upon a table which serves as stage for opaque or non-transparent objects. The object to be examined is placed in this case so that it is situated inside the ring-shaped foot. If the lighting device is attached to the foot of the microscope there is never any danger that the glass plate 16 or the object-glass will be damaged by the adjusting of the fine-adjustment. If the object-glass is lowered beyond the glass plate 16 the entire upper part of the microscope, the foot 12 included, is automatically lifted off the stage 16.

In case the natural light should not be sufficient the device for artificial lighting is used.

The oscillable articulation 35, 36, 37 permits adjusting the lighting device without alteration of the angle of incidence of the source of light.

By the artificial lighting the value of the pocket-microscope for scientific researches is considerably increased. Its range of application is considerably widened as, owing to the exact lighting of the object to be examined, the surfaces of opaque objects can be thoroughly examined.

The lighting device can be mounted upon any pocket microscope without necessitating any alteration of the shape or of the construction of the microscope.

I claim:—

1. A pocket microscope comprising a frame consisting of a foot portion and a standard, an object tube mounted in said standard, fine adjusting means for moving said object toward and from said foot, and a plurality of telescoping tubes mounted in said object tube and adapted to be variably extended to vary the magnification and to be retracted within the object tube to produce a compact structure.

2. A pocket microscope comprising a frame consisting of a foot portion and a standard, an object tube mounted in said standard, fine adjusting means for moving said object tube toward and from said foot, and a plurality of telescoping tubes mounted in said object tube adapted to be variably extended and to be retracted within said object tube, each of said tubes having a scale thereon to indicate the extension thereof and consequent magnification of the instrument.

3. A pocket microscope comprising a frame consisting of a foot, a sleeve and a member connecting said foot and said sleeve, an object tube mounted in said sleeve, fine adjusting means for moving said object tube toward and from said foot, and a plurality of telescoping tubes mounted in said object tube adapted to be variably extended and to be retracted within said object tube.

4. A pocket microscope comprising a frame consisting of an annular foot, a sleeve coaxial therewith and a member connecting said foot and said sleeve, an object tube mounted in said sleeve, fine adjusting means for moving said object tube towards and from said foot, and a plurality of telescoping tubes mounted in said object tube adapted to be variably extended and to be retracted within said object tube.

5. A pocket microscope comprising a frame consisting of a base, a sleeve and a connecting member, an object tube mounted in said sleeve, fine adjusting means for moving said object tube toward and from said base, a plurality of telescoping tubes mounted in said object tube, and a stage mounted in said base and axially movable therein in a direction away from said object tube.

6. A pocket microscope comprising a frame consisting of a base and a standard substantially at right angles to the base, an object tube mounted in said standard, fine adjusting means for moving said object tube toward and from said base, a plurality of telescoping tubes mounted in said object tube, a support mounted in said base and movable therein in a direction away from said object tube, a transparent stage carried by said support, and a reflector carried by said support below said stage.

7. A pocket microscope comprising a frame consisting of a foot, a sleeve and a member connecting said foot and said sleeve, an exteriorly threaded object tube mounted in said sleeve, an interiorly threaded ring rotatable on said sleeve and engaging said threaded object tube for adjusting the latter toward and from said foot.

8. A pocket microscope comprising a frame consisting of a foot, a sleeve and a member connecting said foot and said sleeve, an exteriorly threaded object tube mounted in said sleeve, an interiorly threaded ring rotatable on said sleeve and engaging said threaded object tube, said object tube having a longitudinal groove and a guide member supported by said sleeve and projecting into said groove.

9. In a pocket microscope, a frame consisting of a foot portion and a standard, an object tube mounted in said standard, a clamp adapted to be removably attached to said frame, a support for an illuminant, and a connection between said support and said clamp permitting adjustment of the illuminant toward and from the field while preserving substantially constant the angle of incidence of the light rays on said field.

10. In a pocket microscope, a frame consisting of a foot portion, a sleeve and a member connecting said foot and said sleeve, an object tube mounted in said sleeve, a ring adapted to be clamped around said sleeve, a support for an illuminant, and an articulated connection between said ring and said support permitting adjustment of the illuminant towards and from the field while preserving the angle of incidence of the light rays on the field substantially constant.

11. In a pocket microscope, a frame consisting of a foot portion and a standard, a removable member adapted to be connected to said frame, a support for an illuminant, and an articulated connection between said member and support permitting adjustment of the illuminant towards and from the field of the microscope while preserving the angle of incidence of the light rays thereon substantially constant.

In testimony whereof I affix my signature in presence of two witnesses.

CARL HENSOLDT.

Witnesses:
 IVAN LAVUTSKY,
 H. R. SOMMERHOFF.